(12) United States Patent
Fukuzawa et al.

(10) Patent No.: US 7,132,148 B2
(45) Date of Patent: Nov. 7, 2006

(54) OPTICAL RECORDING DISK

(75) Inventors: Narutoshi Fukuzawa, Tokyo (JP); Tatsuhiro Kobayashi, Tokyo (JP); Takashi Kikukawa, Tokyo (JP)

(73) Assignee: TDK Corporation, Tokyo (JP)

( * ) Notice: Subject to any disclaimer, the term of this patent is extended or adjusted under 35 U.S.C. 154(b) by 133 days.

(21) Appl. No.: 10/974,552

(22) Filed: Oct. 27, 2004

(65) Prior Publication Data

US 2005/0169157 A1    Aug. 4, 2005

(30) Foreign Application Priority Data

Oct. 28, 2003    (JP) ............................. 2003-366810

(51) Int. Cl.
*B32B 3/02*    (2006.01)

(52) U.S. Cl. ................ 428/64.1; 428/64.4; 430/270.12

(58) Field of Classification Search ............... 428/64.4; 430/270.12

See application file for complete search history.

(56) References Cited

U.S. PATENT DOCUMENTS

| | | | | |
|---|---|---|---|---|
| 5,955,168 | A * | 9/1999 | Min et al. ................... | 428/64.1 |
| 2005/0219994 | A1 * | 10/2005 | Fukuzawa et al. ....... | 369/275.2 |
| 2005/0255282 | A1 * | 11/2005 | Fukuzawa et al. ......... | 428/64.4 |

FOREIGN PATENT DOCUMENTS

| | | |
|---|---|---|
| JP | 2004087073 | 3/2004 |
| JP | 2004-220687 | 8/2004 |

OTHER PUBLICATIONS

Kim, J. et al., "Random Pattern Signal Characteristics of Super-RENS Disk at Blue Laser System," Topical Meeting on Optical Data Storage (20th : 2004 : Monterey, Calif.), Apr. 18-21, 2004, pp. 273-275.

* cited by examiner

*Primary Examiner*—ELizabeth Mulvaney
(74) *Attorney, Agent, or Firm*—Seed IP Law Group PLLC

(57) ABSTRACT

An optical recording disc is constituted by laminating a substrate, a reflective layer, a third dielectric layer, a light absorption layer, a second dielectric layer, a metal recording layer, a first dielectric layer and a light transmission layer in this order, and is constituted so that when a laser beam is irradiated onto the optical recording disc from the side of the light transmission layer, the metal recording layer is deformed and/or is changed in quality to form a state-changed region in the metal recording layer and the second dielectric layer and the light absorption layer are deformed and/or are changed in quality to form state-changed regions in the second dielectric layer and the light absorption layer, whereby a recording mark is formed in the metal recording layer, the second dielectric layer and the light absorption layer.

In the thus constituted optical recording disc, even in the case where the length of the recording mark and the length of a blank region between neighboring recording marks are shorter than the resolution limit, it is possible to record data constituted by a recording mark train including the recording mark and the blank region in the optical recording disc and reproduce the data therefrom in a desired manner and markedly increase the storage capacity of the optical recording disc.

20 Claims, 6 Drawing Sheets

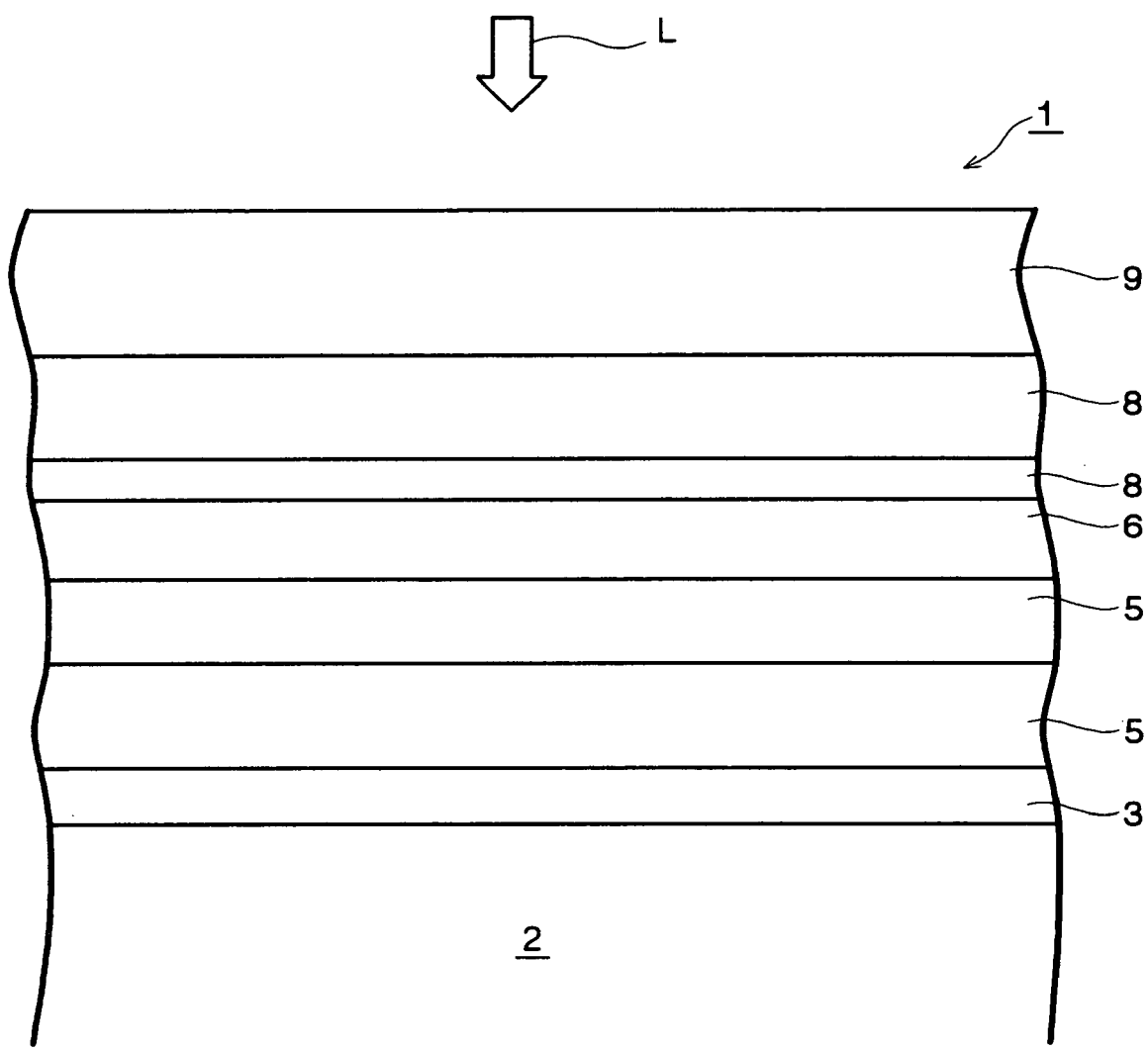

OPTICAL RECORDING DISK

BACKGROUND OF THE INVENTION

The present invention relates to an optical recording disc and, particularly, to an optical recording disc which can record data therein and reproduce data therefrom even in the case where the lengths of a recording mark and a blank region between neighboring recording marks which constitute the data are shorter than the resolution limit and whose storage capacity can be markedly increased.

DESCRIPTION OF THE PRIOR ART

Optical recording discs such as the CD, DVD and the like have been widely used as recording media for recording digital data and an optical recording disc that offers improved recording density and has an extremely high data transfer rate has been recently developed.

In such an optical recording disc, the storage capacity of the optical recording disc is improved by reducing a wavelength $\lambda$ of a laser beam used for recording and reproducing data and increasing a numerical aperture NA of an objective lens, thereby reducing the diameter of the laser beam spot.

In an optical recording disc, in the case where the length of a recording mark formed in the optical recording disc and the length between neighboring recording marks, namely, the length of a region (hereinafter referred to as "a blank region") where no recording mark is formed are shorter than the resolution limit, data cannot be reproduced from the optical recording disc.

The resolution limit is determined by the wavelength $\lambda$ of a laser beam and the numerical aperture NA of an objective lens for converging the laser beam and in the case where the frequency of repetition of a recording mark and a blank region, namely, the spatial frequency, is equal to or larger than $2NA/\lambda$, data recorded in the recording mark and the blank region cannot be read.

Therefore, the lengths of the recording mark and the blank region corresponding to the spatial frequency which can be read both become equal to or larger than $4NA/\lambda$ and in the case where an objective lens having a numerical aperture NA is used to converge a laser beam having a wavelength $\lambda$ on the surface of an optical recording disc, a recording mark having a length of $4NA/\lambda$ and a blank region having a length of $4NA/\lambda$ are the shortest recording mark and the shortest blank region which can be read.

Thus when data recorded in an optical recording disc are to be reproduced, there exists a resolution limit within which data can be read and the length of a recording mark and the length of a blank region which can be read are restricted. Therefore, if a recording mark having a length shorter than the resolution limit and a blank region having a length shorter than the resolution limit are formed in an optical recording disc, thereby recording data therein, the thus recorded data cannot be reproduced, so that the length of a recording mark and the length of a blank region which can be formed for recording data in an optical recording disc are inevitably restricted and a recording mark having a length shorter than the resolution limit and a blank region having a length shorter than the resolution limit are not normally formed in an optical recording disc to record data therein.

Therefore, in order to increase the storage capacity of an optical recording disc, it is required to shorten the wavelength $\lambda$ of the laser beam used for reproducing data or increase the numerical aperture NA of the objective lens, thereby decreasing the resolution limit so that data consisting of a recording mark having a shorter length and a blank region having a shorter length can be reproduced.

However, there is a limit to how far the wavelength $\lambda$ of the laser beam used for reproducing data can be shortened and how far the numerical aperture NA of the objective lens can be increased, so that the increase in the storage capacity of an optical recording disc which can be achieved by shortening the wavelength $\lambda$ of the laser beam used for reproducing data or increasing the numerical aperture NA of the objective lens, thereby decreasing the resolution limit, is limited.

SUMMARY OF THE INVENTION

It is therefore an object of the present invention to provide an optical recording disk which can record data therein and reproduce data therefrom even in the case where the lengths of a recording mark and a blank region between neighboring recording marks which constitute the data are shorter than the resolution limit and whose storage capacity can be markedly increased.

The inventors of the present invention vigorously pursued a study for accomplishing the above object and, as a result, made the discovery that in the case where an optical recording disk constituted so that data were recorded therein or reproduced therefrom by irradiating a laser beam thereonto included a multi-layered body including a metal recording layer containing a metal whose thermal conductivity was equal to or smaller than $2.0\ W/(cm \cdot K)$ as a primary component and a light absorption layer, which were formed so as to sandwich at least a dielectric layer therebetween, when a laser beam was irradiated onto the optical recording disc, a region of the metal recording layer, regions of the metal recording layer and the dielectric layer or regions of the metal recording layer, the dielectric layer and the light absorption layer which were irradiated with the laser beam was deformed and/or was changed in quality to form a state-changed region, whereby a recording mark was formed and data were recorded in the optical recording disc and that in the case where data had been recorded in the optical recording disc in this manner, even when the length of a recording mark or the length of a blank region between neighboring recording marks constituting a recording mark train was shorter than the resolution limit, data recorded in the optical recording disc could be reproduced by irradiating the laser beam onto the optical recording disc.

The present invention is based on this finding, the above object of the present invention can be accomplished by an optical recording disc constituted so that data are recorded therein or reproduced therefrom by irradiating a laser beam thereonto, which comprises a multi-layered body including a metal recording layer containing a metal whose thermal conductivity is equal to or smaller than $2.0\ W/(cm \cdot K)$ as a primary component and a light absorption layer, which are formed so as to sandwich at least a dielectric layer therebetween.

In the present invention, the statement that a metal recording layer, a metal recording layer and a dielectric layer or a metal recording layer, a dielectric layer and a light absorption layer are changed in quality means that refractive indexes or extinction coefficients of the metal recording layer, the metal recording layer and the dielectric layer disposed adjacent to the metal recording layer or the metal recording layer, the dielectric layer disposed adjacent to the metal recording layer and the light absorption layer disposed adjacent to the dielectric layer change and includes a case where the metal recording layer, the metal recording layer and the dielectric layer or the metal recording layer, the dielectric layer and the light absorption layer are changed in quality with the deformation of the metal recording layer, the metal recording layer and the dielectric layer or the metal recording layer, the dielectric layer and the light absorption layer and a case where the metal recording layer, the metal recording layer and the dielectric layer or the metal recording layer, the dielectric layer and the light absorption layer are deformed with the change in quality of the metal recording layer, the metal recording layer and the dielectric layer or the metal recording layer, the dielectric layer and the light absorption layer.

Further, in the present invention, in order to enable stable reproduced signals to be obtained by employing a laser beam whose power is set to be higher than a normal power and repeatedly reproducing data recorded in the optical recording disc, it is preferable that a region of the metal recording layer, regions of the metal recording layer and the dielectric layer or regions of the metal recording layer, the dielectric layer and the light absorption layer which are irradiated with the laser beam irreversibly are changed in quality when a recording mark is formed by irradiating the laser beam onto the metal recording layer, the metal recording layer and the dielectric layer or the metal recording layer, the dielectric layer and the light absorption layer so that state-changed regions of the metal recording layer, the metal recording layer and the dielectric layer or the metal recording layer, the dielectric layer and the light absorption layer are kept changed in quality even when the laser beam whose power is set to be higher than a normal power is repeatedly irradiated onto the state-changed regions of the metal recording layer, the metal recording layer and the dielectric layer or the metal recording layer, the dielectric layer and the light absorption layer for reproducing data recorded in the optical recording disc in the case where a region of the metal recording layer, regions of the metal recording layer and the dielectric layer or regions of the metal recording layer, the dielectric layer and the light absorption layer which are irradiated with the laser beam are changed in quality without being deformed to form the state-changed regions, thereby forming a recording mark.

Although it is not altogether clear why, in the case where the metal recording layer, the metal recording layer and the dielectric layer or the metal recording layer, the dielectric layer and the light absorption layer are deformed and/or are changed in quality to form state-changed regions, whereby a recording mark is formed and data are recorded in the optical recording disc, the thus recorded data can be reproduced even when the length of a recording mark or the length of a blank region between neighboring recording marks constituting a recording mark train was shorter than the resolution limit, it is reasonable to assume that this is because the resolution limit becomes smaller for some reason when a laser beam for reproducing data is irradiated onto the state-changed regions formed in the metal recording layer, the metal recording layer and the dielectric layer or the metal recording layer, the dielectric layer and the light absorption layer.

According to the present invention, since data can be reproduced even in the case where the length of a recording mark or the length of a blank region between neighboring recording marks constituting a recording mark train is shorter than the resolution limit, data can be recorded in an optical recording disc with higher density and it is therefore possible to markedly increase the storage capacity of an optical recording disc.

In a study done by the inventors of the present invention, it was found that whether the metal recording layer was deformed and/or was changed in quality, the metal recording layer and the dielectric layer disposed adjacent to the metal recording layer were deformed and/or were changed in quality or the metal recording layer, the dielectric layer disposed adjacent to the metal recording layer and the light absorption layer disposed adjacent to the dielectric layer were deformed and/or were changed in quality when a laser beam is irradiated onto the optical recording disc depended upon the power of the laser beam irradiated onto the optical recording disc but that it was sufficient for at least the metal recording layer to be deformed and/or be changed in quality, thereby forming the state-changed region in the metal recording layer.

Therefore, in a preferred aspect of the present invention, the optical recording disc is constituted so that when the laser beam is irradiated thereonto, at least the metal recording layer is deformed and/or is changed in quality to form a state-changed region in the metal recording layer, whereby a recording mark is formed in the metal recording layer.

In the present invention, it is preferable to form the metal recording layer so as to have a thickness of 1 nm to 20 nm and it is more preferable to form the metal recording layer so as to have a thickness of 1 nm to 10 nm. In the case where the thickness of the metal recording layer is smaller than 1 nm, since the metal recording layer is only slightly deformed and/or changed in quality, it is difficult to form a distinct state-changed region in the metal recording layer and it is therefore impossible to obtain a signal having a good C/N ratio by reproducing data recorded in the optical recording disc. On the other hand, in the case where the thickness of the metal recording layer is larger than 20 nm, since the thermal conductivity of the metal recording layer becomes too high, it is difficult to enable the metal recording layer to be deformed and/or be changed in quality to form a state-changed region in the metal recording layer, thereby forming a recording mark, unless a laser beam having a high power is employed and since the reflectivity of the metal recording layer becomes too high, it is difficult to irradiate a desired amount of the laser beam onto the light absorption layer.

In the present invention, it is preferable to form the metal recording layer so as to contain at least one kind of metal selected from a group consisting of Ti, Sn, Pt, Zn and Mg or an alloy thereof.

Each of Ti, Sn, Pt, Zn and Mg has thermal conductivity suitable for causing the metal recording layer or the metal recording layer and the dielectric layer disposed adjacent to the metal recording layer to be deformed and/or be changed in quality to form a state-changed region and for forming a recording mark so that the boundary between the recording mark and a blank region becomes distinct in the case where the outputs of semiconductor laser beam sources presently available are assumed. To the contrary, in the case where a metal such as Ag whose thermal conductivity is higher than that of Ti, Sn, Pt, Zn or Mg is employed as the material for forming the metal recording layer, it is necessary to use a laser beam having a high power for recording data and in the case where a dielectric material capable of absorbing light of a wavelength corresponding to that of a laser beam for recording data or the like is employed as the material for forming the metal recording layer, since the thermal conductivity of the metal recording layer becomes to low and a large amount of heat is apt to be accumulated at a region where a recording mark is to be formed when data are to be recorded in the optical recording disc, the boundary between the recording mark and a blank region becomes indistinct and it is extremely difficult to form a minute recording mark whose length is equal to or shorter than the resolution limit. To the contrary, it is assumed that in the case where a metal material containing metal whose thermal conductivity is equal to or lower than 2.0 W/(cm·K) as a primary component is employed as a material for forming the metal recording layer, it is possible to form a minute recording mark whose length is equal to or shorter than the resolution limit so that the boundary between the recording mark and a blank region becomes distinct and record data in the optical recording disc, and data can be recorded in the optical recording disc in a desired manner using a laser beam whose recording power is set to be equal to or lower than the maximum outputs of semiconductor laser beam sources presently available.

In a further preferred aspect of the present invention, the optical recording disc is constituted so that when the laser beam is irradiated thereonto, the dielectric layer disposed adjacent to the metal recording layer is further deformed and/or changed in quality in addition to the metal recording layer and state-changed regions are formed in the dielectric layer as well as the metal recording layer, whereby a recording mark is formed in the metal recording layer and the dielectric layer.

According to this preferred aspect of the present invention, since when the laser beam is irradiated onto the optical recording disc, not only the metal recording layer but also the dielectric layer is deformed and/or is changed in quality and a state-changed region is also formed in the dielectric layer, optical characteristics of the state-changed regions formed in the metal recording layer and the dielectric layer are greatly different from those of regions of the metal recording layer and the dielectric layer where no state-changed region is formed. Therefore, since a difference in optical paths between the thus formed recording mark and a blank region becomes greater, it is possible to further improve the C/N ratio of a reproduced signal.

In a further preferred aspect of the present invention, the optical recording disc is constituted so that when the laser beam is irradiated thereonto, the dielectric layer disposed adjacent to the metal recording layer and the light absorption layer disposed adjacent to the dielectric layer are deformed and/or are changed in quality in addition to the metal recording layer and state-changed regions are formed in the light absorption layer as well as the metal recording layer and the dielectric layer, whereby a recording mark is formed in the metal recording layer, the dielectric layer and the light absorption layer.

According to this preferred aspect of the present invention, since when the laser beam is irradiated onto the optical recording disc, the dielectric layer and the light absorption layer as well as the metal recording layer are deformed and/or are changed in quality and state-changed regions are further also formed in the dielectric layer and the light absorption layer, optical characteristics of the state-changed regions formed in the metal recording layer, the dielectric layer and the light absorption layer are greatly different from those of regions of the metal recording layer, the dielectric layer and the light absorption layer where no state-changed region is formed. Therefore, since a difference in optical paths between the thus formed recording mark and a blank region becomes much greater, it is possible to much further improve the C/N ratio of a reproduced signal.

In a further preferred aspect of the present invention, the light absorption layer contains at least one kind of metal selected from the group consisting of Sb and Te.

According to this preferred aspect of the present invention, it is possible to fabricate the optical recording disc including the light absorption layer having a high light absorption coefficient and low thermal conductivity.

In a further preferred aspect of the present invention, the dielectric layer is formed of a mixture of $SiO_2$ and ZnS.

According to this preferred aspect of the present invention, it is possible to physically and chemically protect the metal recording layer and the light absorption layer by the dielectric layer.

The above and other objects and features of the present invention will become apparent from the following description made with reference to the accompanying drawings.

BRIEF DESCRIPTION OF THE DRAWINGS

FIG. 2 is an enlarged schematic cross-sectional view of a part of the optical recording disc indicated by A in FIG. 1.

DESCRIPTION OF THE PREFERRED EMBODIMENTS

Figure 1:
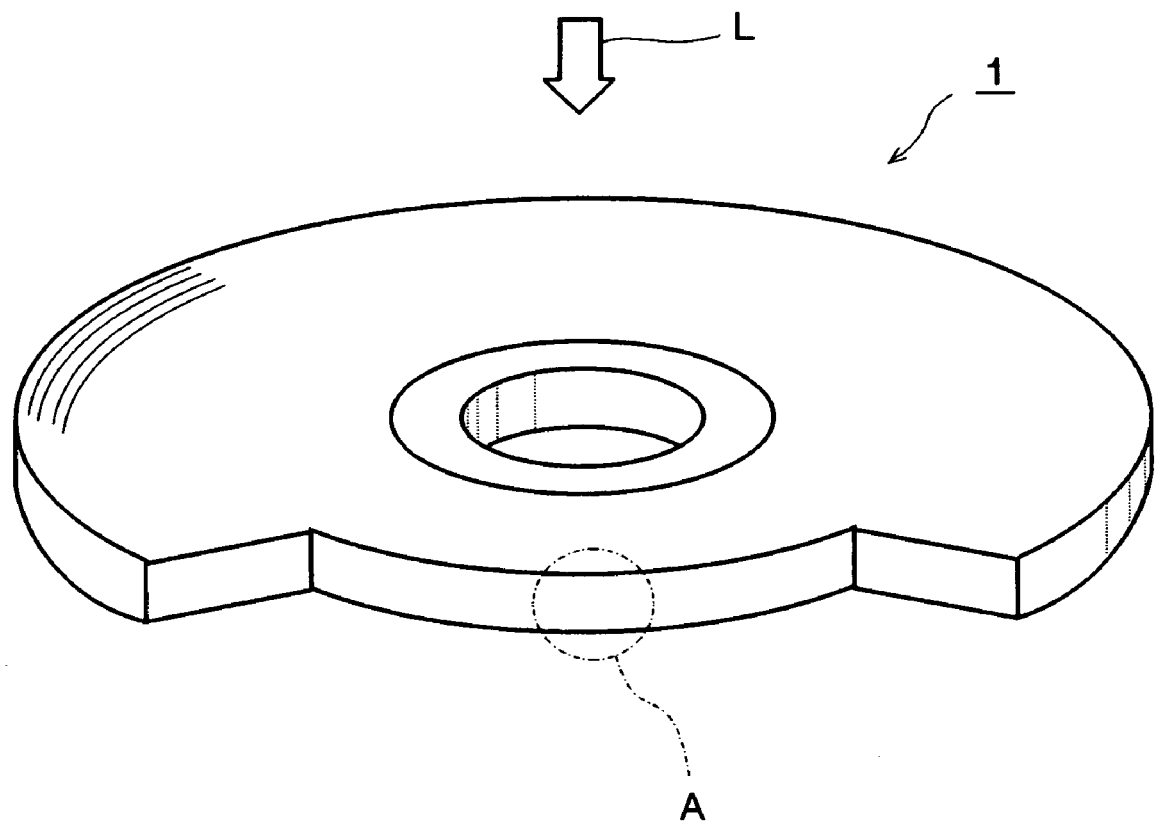
FIG. 1 is a schematic cross-sectional view showing an optical recording disc 1 that is a preferred embodiment of the present invention.

FIG. 1 is a schematic perspective view showing an optical recording disc that is a preferred embodiment of the present invention and FIG. 2 is an enlarged schematic cross-sectional view of the part of the optical recording disc indicated by A in FIG. 1 among cross sections of the optical recording disc taken along a track formed thereon.

As shown in FIG. 2, an optical recording disc 1 according to this embodiment includes a substrate 2, and a reflective layer 3, a third dielectric layer 4, a light absorption layer 5, a second dielectric layer 6, a metal recording 7, a first dielectric layer 8 and a light transmission layer 9 are laminated on the substrate 2 in this order.

In this embodiment, the optical recording disc 1 is constituted so that data are recorded therein and data recorded therein are reproduced therefrom by irradiating a laser beam L from the side of the light transmission layer 9. The laser beam L has a wavelength λ of 390 nm to 420 nm and is converged onto the optical recording disc 1 using an objective lens (not shown) having a numerical aperture of 0.7 to 0.9.

The substrate 2 serves as a support of the optical recording disc 1 for ensuring mechanical strength required for the optical recording disc 1.

The material usable for forming the substrate 2 is not particularly limited insofar as the substrate 2 can serve as the support of the optical recording disc 1. The substrate 2 can be formed of glass, ceramic, resin or the like. Among these, resin is preferably used for forming the substrate 2 since resin can be easily shaped. Illustrative examples of resins suitable for forming the substrate 2 include polycarbonate resin, polyolefin resin, acrylic resin, epoxy resin, polystyrene resin, polyethylene resin, polypropylene resin, silicone resin, fluoropolymers, acrylonitrile butadiene styrene resin, urethane resin and the like. Among these, polycarbonate resin and polyolefin resin are most preferably used for forming the substrate 2 from the viewpoint of easy processing, optical characteristics and the like.

The thickness of the substrate 2 is not particularly limited but it is preferable to form the substrate 2 so as to have a thickness of 1.0 mm to 1.2 mm from the viewpoint of compatibility with optical recording discs currently circulated and it is more preferable to form the substrate 2 so as to have the thickness of about 1.1 mm.

As shown in FIG. 2, the reflective layer 3 is formed on the surface of the substrate 2.

In this embodiment, the reflective layer 3 serves to reflect the laser beam L entering through the light transmission layer 9 so as to emit it from the light transmission layer 9.

The material usable for forming the reflective layer 3 is not particularly limited insofar as the reflective layer 3 can reflect the laser beam L and the reflective layer 3 can be formed of at least one kind of element selected from a group consisting of Au, Ag, Cu, Pt, Al, Ti, Cr, Fe, Co, Ni, Mg, Zn, Ge, Si, Pd and Nd. It is preferable to form the reflective layer 3 of a noble metal alloy including Ag, Pd and Cu.

The reflective layer 3 can be formed on the substrate 2 by a gas phase growth process using chemical species containing elements for forming the reflective layer 3. Illustrative examples of the gas phase growth processes include vacuum deposition process, sputtering process and the like.

The thickness of the reflective layer 3 is not particularly limited. However, the reproduction durability of the optical recording disk 1 improves as the reflective layer 3 becomes thicker but the productivity thereof declines when the reflective layer 3 is too thick. Therefore, the reflective layer 3 is preferably formed to have a thickness of 5 nm to 200 nm, more preferably a thickness of 10 nm to 150 nm.

As shown in FIG. 2, the third dielectric layer 4 is formed on the surface of the reflective layer 3.

In this embodiment, the third dielectric layer 4 serves to physically and chemically protect the light absorption layer 5 in cooperation with the reflective layer 3.

The material usable for forming the third dielectric layer 4 is not particularly limited and the third dielectric layer 4 can be formed of a dielectric material containing oxide, sulfide, nitride or the combination thereof as a primary component. It is preferable to form the third dielectric layer 4 of oxide, nitride, sulfide or fluoride containing at least one element selected from a group consisting of Si, Zn, Al, Ta, Ti, Co, Zr, Pb, Ag, Sn, Ca, Ce, V, Cu, Fe and Mg, or a combination thereof. Among these, a mixture of ZnS and $SiO_2$ is preferable as the dielectric material for forming the third dielectric layer 4 and it is more preferable to set the mole ratio of ZnS to $SiO_2$ to 80:20.

The third dielectric layer 4 can be formed by a gas phase growth process using chemical species containing elements for forming the third dielectric layer 4. Illustrative examples of the gas phase growth processes include vacuum deposition process, sputtering process and the like.

The thickness of the third dielectric layer 4 is not particularly limited. However, since the third dielectric layer 4 cannot serve as the protective layer when the third dielectric layer 4 is formed too thin, while the productivity of the optical recording disk 1 declines when the third dielectric layer 4 is formed too thick, the third dielectric layer 4 is preferably formed to have a thickness of 1 nm to 140 nm, more preferably a thickness of 20 nm to 140 nm.

As shown in FIG. 2, the light absorption layer 5 is formed on the surface of the third dielectric layer 4.

In this embodiment, the light absorption layer 5 serves to absorb a laser beam L whose power is set to a recording power or a reproducing power and which is irradiated onto the optical recording disc 1 and generate heat.

In this embodiment, the light absorption layer 5 is formed of an alloy containing at least one of Sb and Te having a high light absorption coefficient and low thermal conductivity.

As an alloy contained in the light absorption layer 5 and containing at least one of Sb and Te, an alloy represented by the general formula: $(Sb_aTe_{1-a})_{1-b}M_b$ or $\{(GeTe)_c(Sb_2Te_3)_{1-c}\}_d X_{1-d}$ is particularly preferable. Here, the element M represents an element other than Sb and Te and the element X represents an element other than Sb, Te and Ge.

In the case where the alloy which contains at least one of Sb and Te and is contained in the light absorption layer 5 is represented by the general formula: $(Sb_aTe_{1-a})_{1-b}M_b$, it is preferable for a and b to be such that a is equal to or larger than 0 and equal to or smaller than 1 and that b is equal to or larger than 0 and equal to or smaller than 0.25. In the case where b is larger than 0.25, the light absorption coefficient of the light absorption layer 5 becomes lower than the required value and the thermal conductivity thereof becomes lower than the required value.

The element M is not particularly limited but it is preferable for the element M to be at least one element selected from the group consisting of In, Ag, Au, Bi, Se, Al, Ge, P, H, Si, C, V, W, Ta, Zn, Mn, Ti, Sn, Pb, Pd, N, O and rare earth elements (Sc, Y and lanthanoid) as a primary component.

On the other hand, in the case where the alloy contained in the light absorption layer 5 and containing at least one of Sb and Te is represented by the general formula: $\{(GeTe)_c(Sb_2Te_3)_{1-c}\}_d X_{1-d}$, it is preferable to set c and d such that c is equal to or larger than ⅓ and equal to or smaller than ⅔ and d is equal to or larger than 0.9.

The element X is not particularly limited but it is preferable for the element X to be at least one element selected from a group consisting of In, Ag, Au, Bi, Se, Al, Ge, P, H, Si, C, V, W, Ta, Zn, Mn, Ti, Sn, Pb, Pd, N, O and rare earth elements as a primary component.

In the case where a laser beam L having a wavelength λ of 380 nm to 450 nm is employed, it is particularly preferable for the element M to be at least one element selected from a group consisting of Ag, In, Ge and rare earth elements and it is particularly preferable for the element X to be at least one element selected from a group consisting of Ag, In and rare earth elements.

The light absorption layer 5 can be formed on the surface of the third dielectric layer 4 by a gas phase growth process using chemical species containing elements for forming the light absorption layer 5. Illustrative examples of the gas phase growth processes include vacuum deposition process, sputtering process and the like.

It is preferable for the light absorption layer 5 to have a thickness of 5 nm to 100 nm. In the case where the thickness of the light absorption layer 5 is smaller than 5 nm, the amount of light absorbed therein becomes too small and on the other hand, in the case where the thickness of the light absorption layer 5 is larger than 100 nm, the light absorption layer 5 can not readily deform with the deformation of the metal recording layer 7 as described later.

As shown in FIG. 2, the second dielectric layer 6 is formed on the surface of the light absorption layer 5.

In this embodiment, the second dielectric layer 6 serves to physically and chemically protect the metal recording layer 7 as described later in cooperation with the first dielectric layer 8.

The material usable for forming the second dielectric layer 6 is not particularly limited and the second dielectric layer 6 can be formed of the same material as that used for forming the third dielectric layer 4.

The second dielectric layer 6 can be formed by a gas phase growth process using chemical species containing elements for forming the second dielectric layer 6. Illustrative examples of the gas phase growth processes include vacuum deposition process, sputtering process and the like.

The thickness of the second dielectric layer 6 is not particularly limited, but it is preferable to form the second dielectric layer 6 so as to have a thickness of 5 nm to 120 nm similarly to the third dielectric layer 4.

As shown in FIG. 2, the metal recording layer 7 is formed on the surface of the second dielectric layer 6.

In this embodiment, the metal recording layer 7 is a layer in which a recording mark is to be formed when data are to be recorded in the optical recording disc 1.

In this embodiment, the metal recording layer 7 contains a metal in the form of a simple substance or an alloy thereof as a primary component. The metal recording layer 7 may contain a non-stoichiometric compound of the metal or an alloy thereof and a non-metallic element as a primary component. In the case where the metal recording layer 7 contains a non-stoichiometric compound of the metal or an alloy thereof and a non-metallic element as a primary component, it is preferable for the element ratio of the metal or the alloy thereof to the non-metallic element to be equal to or larger than 90%. It is preferable for the metal contained in the metal recording layer 7 as a primary component to have thermal conductivity equal to or smaller than 2.0 W/(cm·K), and at least one kind of metal selected from the group consisting of Ti, Sn, Pt, Zn and Mg or an alloy thereof is preferably used for forming the metal recording layer 7, for example.

The metal recording layer 7 can be formed on the surface of the second dielectric layer 6 by a sputtering process using a target containing elements for forming the metal recording layer 7.

It is preferable to form the metal recording layer 7 so as to have a thickness of 1 nm to 20 nm and it is more preferable to form the metal recording layer 7 so as to have a thickness of 1 nm to 10 nm.

As shown in FIG. 2, the first dielectric layer 8 is formed on the surface of the metal recording layer 7.

In this embodiment, the first dielectric layer 8 serves to physically and chemically protect the metal recording layer 7.

The material usable for forming the first dielectric layer 8 is not particularly limited and the first dielectric layer 8 can be formed of the same material as that used for forming the third dielectric layer 4.

The first dielectric layer 8 can be formed by a gas phase growth process using chemical species containing elements for forming the first dielectric layer 8. Illustrative examples of the gas phase growth processes include vacuum deposition process, sputtering process and the like.

The thickness of the first dielectric layer 8 is not particularly limited but it is preferable to form the first dielectric layer 8 so as to have a thickness of 1 nm or more and it is more preferable to form the first dielectric layer 8 so as to have a thickness of 10 nm or more similarly to the third dielectric layer 4.

As shown in FIG. 2, the light transmission layer 9 is formed on the surface of the first dielectric layer 8.

The light transmission layer 9 is a layer through which the laser beam L is transmitted and the surface thereof forms a light incidence plane of the laser beam L.

The material usable for forming the light transmission layer 9 is not particularly limited insofar as it is optically transparent and has a low absorption ratio and a low reflectivity with respect to a laser beam having a wavelength $\lambda$ of 390 nm to 420 nm of the laser beam L, and a low birefringence factor. In the case where the light transmission layer 9 is formed using a spin coating process or the like, ultraviolet ray curable resin, electron beam curable resin, thermosetting resin or the like can be preferably used for forming the light transmission layer 9 and ultraviolet ray curable resin and electron beam curable resin can be more preferably used for forming the light transmission layer 9.

The light transmission layer 9 may be formed by adhering a sheet formed of light transmittable resin onto the surface of the first dielectric layer 8 using an adhesive agent.

The thickness of the light transmission layer 9 is not particularly limited. In the case where the light transmission layer 9 is formed using a spin coating process, it is preferable to form the light transmission layer 9 so as to have a thickness of 10 µm to 200 µm. On the other hand, in the case where the light transmission layer 9 is formed by adhering a sheet formed of light transmittable resin onto the surface of the first dielectric layer 8 using an adhesive agent, it is preferable to form the light transmission layer 9 so as to have a thickness of 50 µm to 150 µm.

Data are recorded in and reproduced from the thus constituted optical recording disk in the following manner.

Figure 3A:
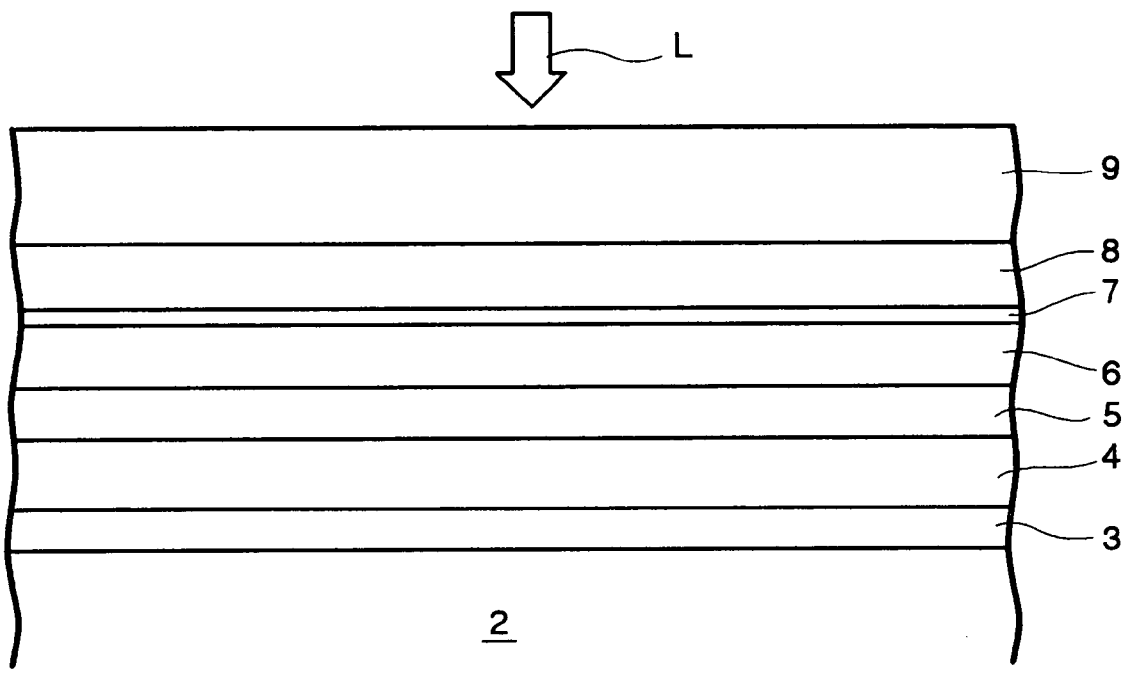
FIG. 3(a) is a partly enlarged schematic cross-sectional view of an optical recording disc before data are recorded therein and FIG. 3(b) is a partly enlarged schematic cross-sectional view of the optical recording disc after data were recorded therein.
Figure 3B:
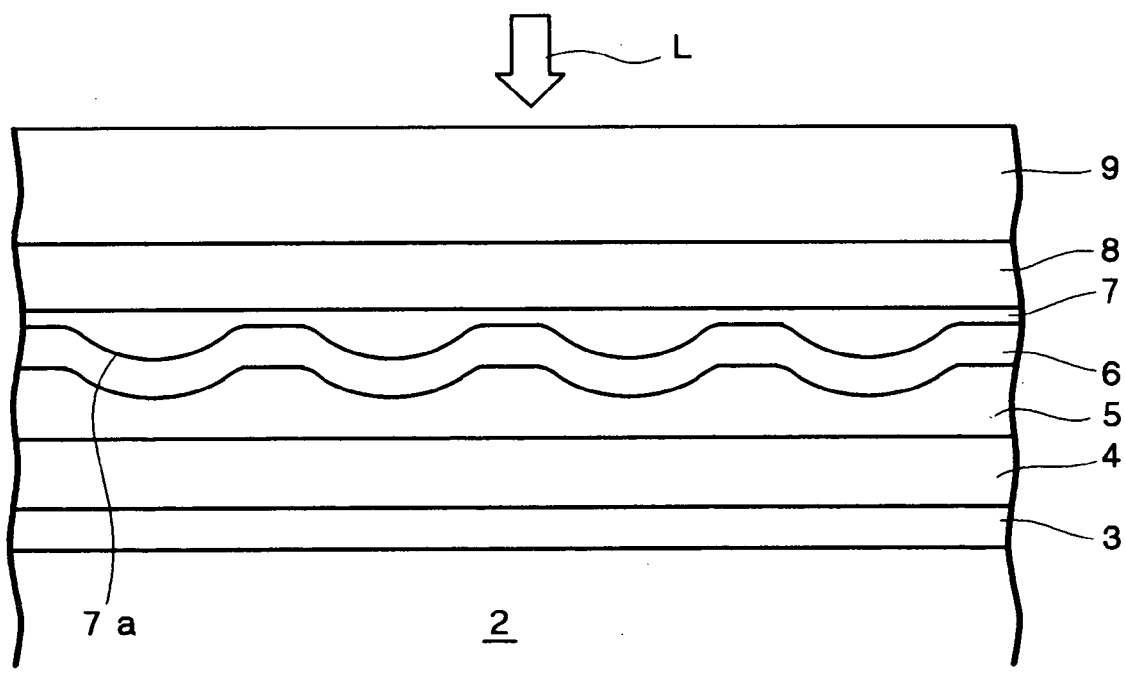

FIG. 3(a) is a partly enlarged schematic cross-sectional view of the optical recording disc 1 before data are recorded therein and FIG. 3(b) is a partly enlarged schematic cross-sectional view of the optical recording disc 1 after data were recorded therein.

When data are to be recorded in the optical recording disk 1, the laser beam L is irradiated onto the optical recording disc 1 from the side of the light transmission layer 9.

In this embodiment, in order to record data in the optical recording disk 1 with high recording density, a laser beam L having a wavelength $\lambda$ of 390 nm to 420 nm is condensed onto the optical recording disk 1 using an objective lens having a numerical aperture NA of 0.7 to 0.9.

The power of the laser beam L is set higher as the linear recording velocity is higher. For example, when the linear recording velocity is set to 4.9 m/s, the power of the laser beam L is set to be higher than 4 mW and equal to or lower than 12 mW. Here, the power of the laser beam L is defined as the power of the laser beam L on the surface of the optical recording disk 1.

When a laser beam L whose power is set to a predetermined power is irradiated onto the optical recording disk 1, regions of the metal recording layer 7 and the light absorption layer 5 exposed to the laser beam L are heated. Thus the temperature of the metal recording layer 7 is increased by heat generated by the laser beam L and absorbed in the metal recording layer 7 itself and also by heat generated in the light absorption layer 5 by the laser beam L and transferred to the metal recording layer 7. The metal recording layer 7 is therefore deformed to produce a state-changed region 7a in the metal recording layer 7 as shown in FIG. 3(b).

At the same time, as shown in FIG. 3(b), the second dielectric layer 6 and the light absorption layer 5 are deformed together with the deformation of the metal recording layer 7, whereby state-changed regions are formed in the second dielectric layer 6 and the light absorption layer 5 correspondingly to the state-changed region 7a formed in the metal recording layer 7.

The state-changed regions formed by the deformation of the metal recording layer 7, the second dielectric layer 6 and the light absorption layer 5 in this manner have different optical characteristics from those of other regions of the metal recording layer 7, the second dielectric layer 6 and the light absorption layer 5 which are not deformed. A recording mark is therefore formed by the state-changed regions formed by the deformation of the metal recording layer 7, the second dielectric layer 6 and the light absorption layer 5.

The laser beam is moved relative to the optical recording disk 1 along a track formed on the optical recording disk 1 and recording marks are formed along the track of the optical recording disk 1 in a similar manner to the above.

In this embodiment, thus formed recording marks and blank regions between neighboring recording marks include ones having a length shorter than 4NA/λ thereby a recording mark train including recording marks and blank regions having lengths shorter than the resolution limit is formed.

Thus, a recording mark train is formed in the optical recording disc 1, thereby recording data therein.

Data recorded in the optical recording disc 1 are reproduced in the following manner.

When data recorded in the optical recording disc 1 are to be reproduced, the laser beam L having a wavelength of 390 nm to 420 nm is first converged onto the optical recording disk 1 by an objective lens having a numerical aperture NA of 0.7 to 0.9.

In this embodiment, the power of the laser beam L irradiated onto the optical recording disk 1 for reproducing data is set to 0.5 mW to 4 mW so as to be higher than that normally used for reproducing data.

In a study done by the inventors of the present invention, it was found that even in the case where the length of the recording mark or the length of the blank region between neighboring recording marks constituting the recording mark train was shorter than the resolution limit, data recorded in the optical recording disc 1 could be reproduced by converging the laser beam L having a wavelength of 390 nm to 420 nm onto the optical recording disc 1 using an objective lens having a numerical aperture NA of 0.7 to 0.9 from the side of the light transmission layer 9.

In the case where data is recorded in the optical recording disc 1 in the form of a recording mark produced by deforming the metal recording layer 7 to produce the state-changed region 7a in the metal recording layer 7 and also deforming the second dielectric layer 6 and the light absorption layer 5 to produce state-changed regions therein, the thus recorded data can be reproduced even when the length of a recording mark or a length of a blank region between neighboring recording marks constituting a recording mark train is shorter than the resolution limit. Although it is not altogether clear why this is possible, it is reasonable to assume that the irradiation of the laser beam L for reproducing data onto the state-changed regions formed in the metal recording layer, the second dielectric layer 6 and the light absorption layer 5 somehow makes the resolution limit smaller.

In this embodiment, since the metal recording layer 7 is made of a metal in the form of a simple substance that has relatively low thermal conductivity or an alloy thereof, the recording sensitivity is excellent. Further, even in the case of repeatedly reproducing data recorded in the optical recording disc 1, the shape of each of the state-changed regions and the shape of each of the recording marks does not change and a new state-changed region is not formed at regions other than regions where the recording marks are formed. Accordingly, it is possible to improve the reproduction durability of an optical recording disc 1.

According to this embodiment, since data can be reproduced even in the case where the length of a recording mark or the length of a blank region between neighboring recording marks constituting a recording mark train is shorter than the resolution limit, it is possible to record data in the optical recording disc 1 with higher density and it is therefore possible to markedly increase the storage capacity of the optical recording disc 1.

Figure 4:
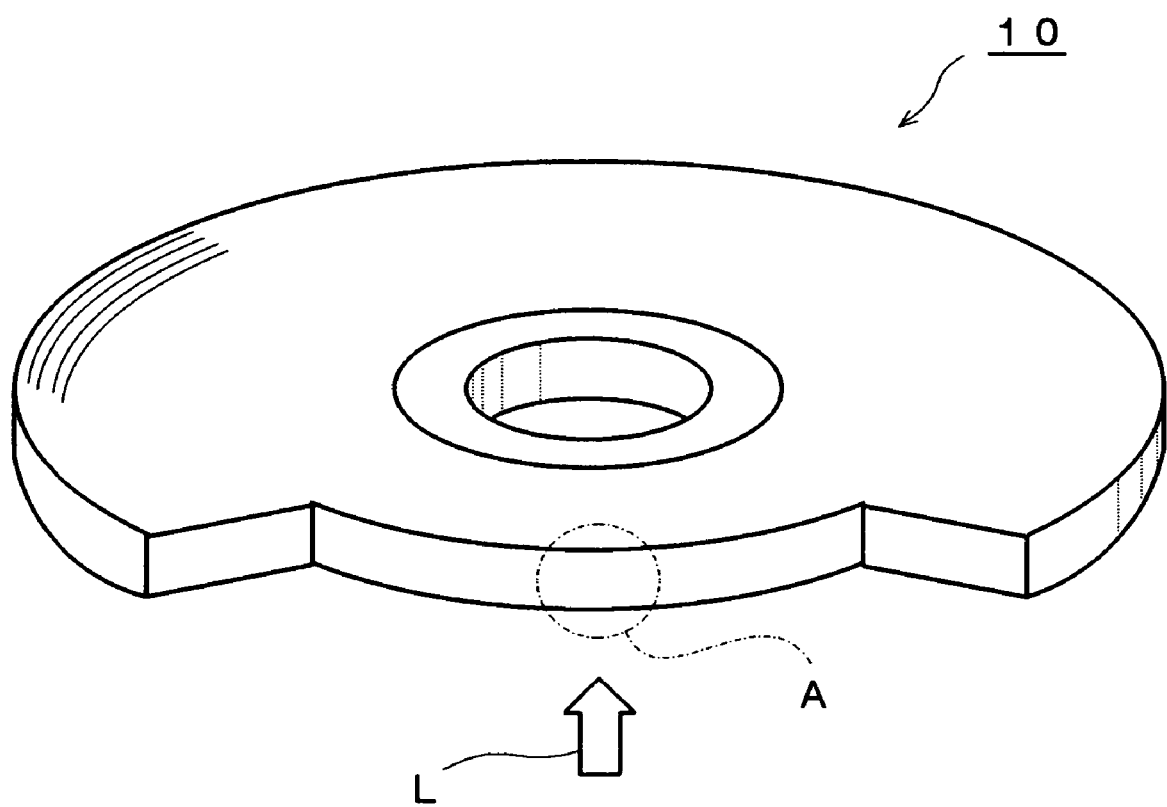
FIG. 4 is a schematic cross-sectional view showing an optical recording disc that is another preferred embodiment of the present invention.
Figure 5:
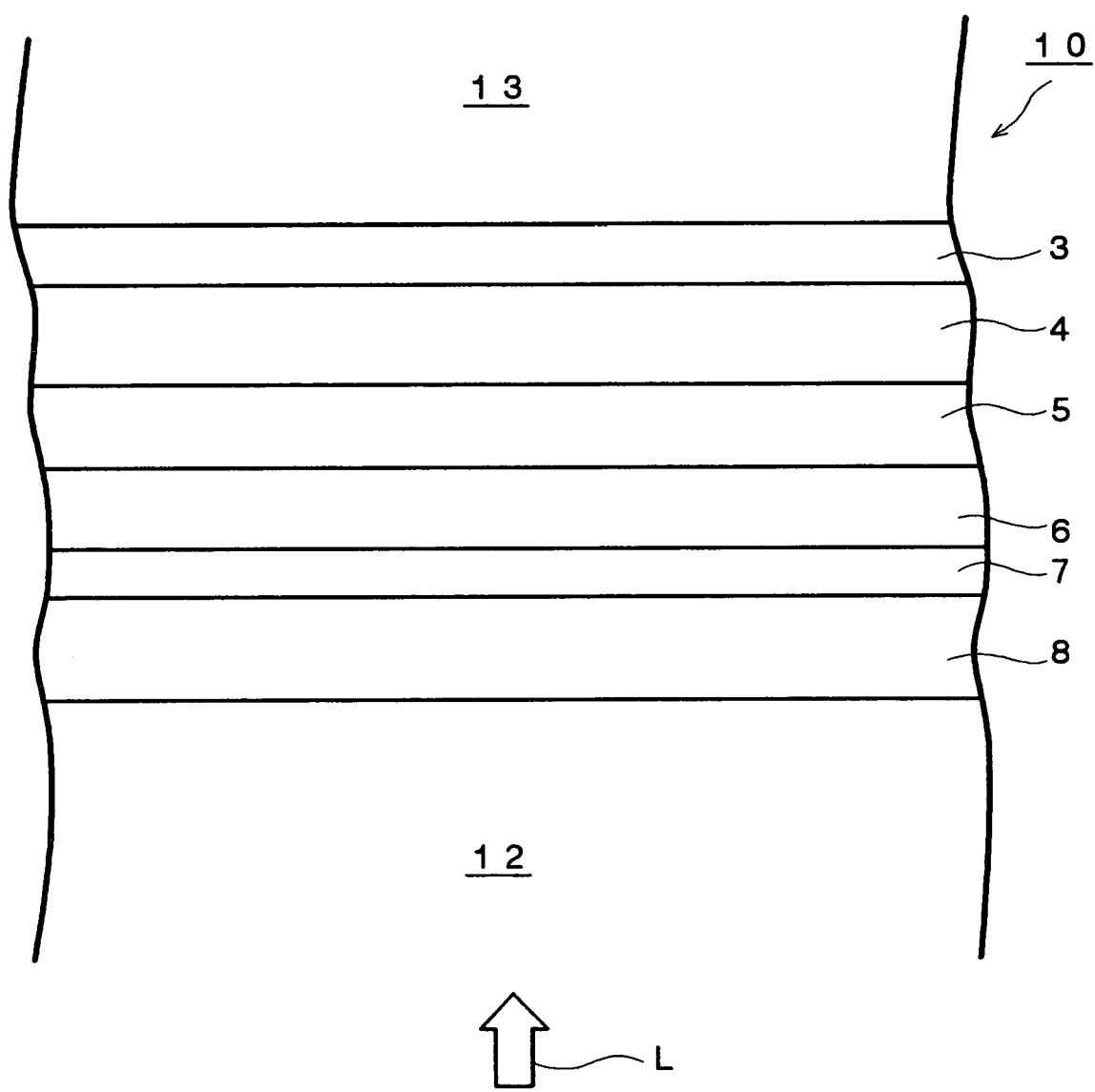
FIG. 5 is an enlarged schematic cross-sectional view of the part of the optical recording disc indicated by A in FIG. 4.

FIG. 4 is a schematic perspective view showing an optical recording disc that is another preferred embodiment of the present invention and FIG. 5 is an enlarged schematic cross-sectional view of a part of the optical recording disc indicated by A in FIG. 4 among cross sections of the optical recording disc taken along a track formed thereon.

As shown in FIGS. 4 and 5, an optical recording disc 10 according to this embodiment includes a light transmissible substrate 12, and a first dielectric layer 8, a metal recording layer 7, a second dielectric layer 6, a light absorption layer 5, a third dielectric layer 4 and a substrate 13 for adjusting the thickness of the optical recording disc 10 are laminated on the light transmissible substrate 12 in this order.

As shown in FIG. 5, the optical recording disc 10 according to this embodiment is constituted so that data are recorded therein and data recorded therein are reproduced therefrom by irradiating a laser beam L thereonto from the side of the light transmissible substrate 12. The laser beam L has a wavelength λ of 630 nm to 675 nm and is converged onto the optical recording disc 10 using an objective lens having a numerical aperture of 0.59 to 0.66.

The light transmissible substrate 12 is a layer through which the laser beam L is transmitted when data are to be recorded in the optical recording disc 10 and data recorded in the optical recording disc 10 are to be reproduced and serves as a support of the optical recording disc 10 for ensuring mechanical strength required for the optical recording disc 10. The light transmissible substrate 12 is formed to be disc-like and so as to have a thickness of about 0.6 mm.

One major surface of the light transmissible substrate 12 forms a light incidence plane of the laser beam L and on the other major surface of the light transmissible substrate 12, a groove (not shown) and a land (not shown) are spirally formed so as to extend from a portion in the vicinity of the center of the light transmissible substrate 12 toward the outer circumference thereof The groove and land serve as a guide track for the laser beam L when data are to be recorded in the optical recording disk 10 or when data are to be reproduced from the optical recording disk 10.

The material usable for forming the light transmissible substrate 12 is not particularly limited insofar as it can transmit a laser beam L having a wavelength λ of 630 nm to 675 nm and serve as the support of the optical recording disc 10. The light transmissible substrate 12 can be formed of glass, ceramic, resin or the like. Among these, resin is preferably used for forming the light transmissible substrate 12 since resin can be easily shaped. Illustrative examples of resins suitable for forming the light transmissible substrate 12 include polycarbonate resin, polyolefin resin, acrylic resin, epoxy resin, polystyrene resin, polyethylene resin, polypropylene resin, silicone resin, fluoropolymers, acrylonitrile butadiene styrene resin, urethane resin and the like.

Among these, polycarbonate resin and polyolefin resin are most preferably used for forming the light transmissible substrate 12 from the viewpoint of easy processing, optical characteristics and the like.

As shown in FIG. 5, the first dielectric layer 8 is formed on the surface of the light transmissible substrate 12.

In this embodiment, the first dielectric layer 8 serves to physically and chemically protect the metal recording layer 7 in cooperation with the light transmissible substrate 12.

The material usable for forming the first dielectric layer 8 is not particularly limited and the first dielectric layer 8 can be formed of a dielectric material containing oxide, sulfide, nitride or the combination thereof as a primary component. It is preferable to form the first dielectric layer 8 of oxide, nitride, sulfide or fluoride containing at least one element selected from a group consisting of Si, Zn, Al, Ta, Ti, Co, Zr, Pb, Ag, Sn, Ca, Ce, V, Cu, Fe and Mg, or a combination thereof. Among these, the mixture of ZnS and $SiO_2$ is preferable as the dielectric material for forming the first dielectric layer 8 and it is more preferable to set the mole ratio of ZnS to $SiO_2$ to be 85:15.

The first dielectric layer 8 can be formed by a gas phase growth process using chemical species containing elements for forming the first dielectric layer 8. Illustrative examples of the gas phase growth processes include vacuum deposition process, sputtering process and the like.

The thickness of the first dielectric layer 8 is not particularly limited but since the first dielectric layer 8 cannot serve as the protective layer when the first dielectric layer 8 is formed too thin and since the productivity of the optical recording disk 10 decreases when the first dielectric layer 8 is formed too thick, it is preferable to form the first dielectric layer 8 so as to have a thickness of 5 nm to 300 nm.

As shown in FIG. 5, the metal recording layer 7 is formed on the surface of the first dielectric layer 8.

In this embodiment, the metal recording layer 7 is a layer in which a recording mark is to be formed when data are to be recorded in the optical recording disc 10.

In this embodiment, the metal recording layer 7 contains a metal in the form of a simple substance or an alloy thereof as a primary component. The metal recording layer 7 may contain a non-stoichiometric compound of the metal or an alloy thereof and a non-metallic element as a primary component. In the case where the metal recording layer 7 contains a non-stoichiometric compound of the metal or an alloy thereof and a non-metallic element as a primary component, it is preferable for the element ratio of the metal or the alloy thereof to the non-metallic element to be equal to or larger than 90%. It is preferable for the metal contained in the metal recording layer 7 as a primary component to have thermal conductivity equal to or smaller than 2.0 W/(cm·K), and at least one kind of metal selected from the group consisting of Ti, Sn, Pt, Zn and Mg or an alloy thereof is preferably used for forming the metal recording layer 7, for example.

The metal recording layer 7 can be formed on the surface of the first dielectric layer 8 by a sputtering process using a target containing elements for forming the metal recording layer 7.

It is preferable to form the metal recording layer 7 so as to have a thickness of 1 nm to 20 nm and it is more preferable to form the metal recording layer 7 so as to have a thickness of 1 nm to 10 nm.

As shown in FIG. 5, the second dielectric layer 6 is formed on the surface of the metal recording layer 7.

In this embodiment, the second dielectric layer 6 serves to physically and chemically protect the light absorption layer 5 as described later in cooperation with the metal recording layer 7.

The material usable for forming the second dielectric layer 6 is not particularly limited and the second dielectric layer 6 can be formed of the same material as that used for forming the first dielectric layer 8.

The second dielectric layer 6 can be formed by a gas phase growth process using chemical species containing elements for forming the second dielectric layer 6. Illustrative examples of the gas phase growth processes include vacuum deposition process, sputtering process and the like.

The thickness of the second dielectric layer 6 is not particularly limited but it is preferable to form the second dielectric layer 6 so as to have a thickness of 5 nm to 300 nm.

As shown in FIG. 5, the light absorption layer 5 is formed on the surface of the second dielectric layer 6.

In this embodiment, the light absorption layer 5 serves to absorb a laser beam L whose power is set to a recording power or a reproducing power and which is irradiated onto the optical recording disc 1 and generate heat.

In this embodiment, the light absorption layer 5 is formed of an alloy containing at least one of Sb and Te having a high light absorption coefficient and low thermal conductivity.

As an alloy contained in the light absorption layer 5 and containing at least one of Sb and Te, an alloy represented by the general formula: $(Sb_aTe_{1-a})_{1-b}M_b$ or $\{(GeTe)_c(Sb_2Te_3)_{1-c}\}_dX_{1-d}$ is particularly preferable. Here, the element M represents an element other than Sb and Te and the element X represents an element other than Sb, Te and Ge.

In the case where the alloy which contains at least one of Sb and Te and is contained in the light absorption layer 5 is represented by the general formula: $(Sb_aTe_{1-a})_{1-b}M_b$, it is preferable for a and b to be such that a is equal to or larger than 0 and equal to or smaller than 1 and that b is equal to or larger than 0 and equal to or smaller than 0.25. In the case where b is larger than 0.25, the light absorption coefficient of the light absorption layer 5 becomes lower than the required value and the thermal conductivity thereof becomes lower than the required value.

The element M is not particularly limited but it is preferable for the element M to be at least one element selected from the group consisting of In, Ag, Au, Bi, Se, Al, Ge, P, H, Si, C, V, W, Ta, Zn, Mn, Ti, Sn, Pb, Pd, N, O and rare earth elements (Sc, Y and lanthanoid) as a primary component.

On the other hand, in the case where the alloy contained in the light absorption layer 5 and containing at least one of Sb and Te is represented by the general formula: $\{(GeTe)_c(Sb_2Te_3)_{1-c}\}_dX_{1-d}$, it is preferable to set c and d such that c is equal to or larger than ⅓ and equal to or smaller than ⅔ and d is equal to or larger than 0.9.

The element X is not particularly limited but it is preferable for the element X to be at least one element selected from a group consisting of In, Ag, Au, Bi, Se, Al, Ge, P, H, Si, C, V, W, Ta, Zn, Mn, Ti, Sn, Pb, Pd, N, O and rare earth elements as a primary component.

The light absorption layer 5 can be formed on the surface of the second dielectric layer 6 by a gas phase growth process using chemical species containing elements for forming the light absorption layer 5. Illustrative examples of the gas phase growth processes include vacuum deposition process, sputtering process and the like.

It is preferable for the light absorption layer 5 to have a thickness of 5 nm to 100 nm. In the case where the thickness of the light absorption layer 5 is smaller than 5 nm, the amount of light absorbed therein becomes too small and on the other hand, in the case where the thickness of the light absorption layer 5 is larger than 100 nm, the light absorption layer 5 can not readily deform with the deformation of the metal recording layer 7 as described later.

As shown in FIG. 5, the third dielectric layer 4 is formed on the surface of the light absorption layer 5.

In this embodiment, the third dielectric layer 4 serves to physically and chemically protect the light absorption layer 5 in cooperation with the second dielectric layer 6.

The material usable for forming the third dielectric layer 4 is not particularly limited and the third dielectric layer 4 can be formed of the same material as that used for forming the first dielectric layer 8.

The third dielectric layer 4 can be formed by a gas phase growth process using chemical species containing elements for forming the third dielectric layer 4. Illustrative examples of the gas phase growth processes include vacuum deposition process, sputtering process and the like.

The thickness of the third dielectric layer 4 is not particularly limited but it is preferable to form the third dielectric layer 4 so as to have a thickness of 5 nm to 300 nm.

As shown in FIG. 5, the substrate 13 for adjusting the thickness of the optical recording disc 10 is laminated on the surface of the third dielectric layer 4.

The substrate 13 for adjusting the thickness of the optical recording disc 10 is a disc-like substrate used for adjusting the thickness of the optical recording disc 1 so that the total thickness thereof is about 1.2 mm. The substrate 13 for adjusting the thickness of the optical recording disc 10 is formed so as to have a thickness of about 0.6 mm similarly to the light transmissible substrate 12. Further, the substrate 13 for adjusting the thickness of the optical recording disc 10 also serves to improve the rigidity of the optical recording disc 10.

The material usable for forming the substrate 13 for adjusting the thickness of the optical recording disc 10 is not particularly limited and the substrate 13 for adjusting the thickness of the optical recording disc 10 can be formed of glass, ceramic, resin or the like similarly to the light transmissible substrate 12.

In this embodiment, since the laser beam L is irradiated onto the metal recording layer 7 via the light transmissible substrate 12 located opposite to the substrate 13 for adjusting the thickness of the optical recording disc 10, it is unnecessary for the substrate 13 for adjusting the thickness of the optical recording disc 10 to have a light transmittance property.

The substrate 13 for adjusting the thickness of the optical recording disc 10 is adhered to the surface of the third dielectric layer 4 to be laminated thereon.

Data are recorded in and reproduced from the thus constituted optical recording disk 10 according to this embodiment in the following manner.

Figure 6A:
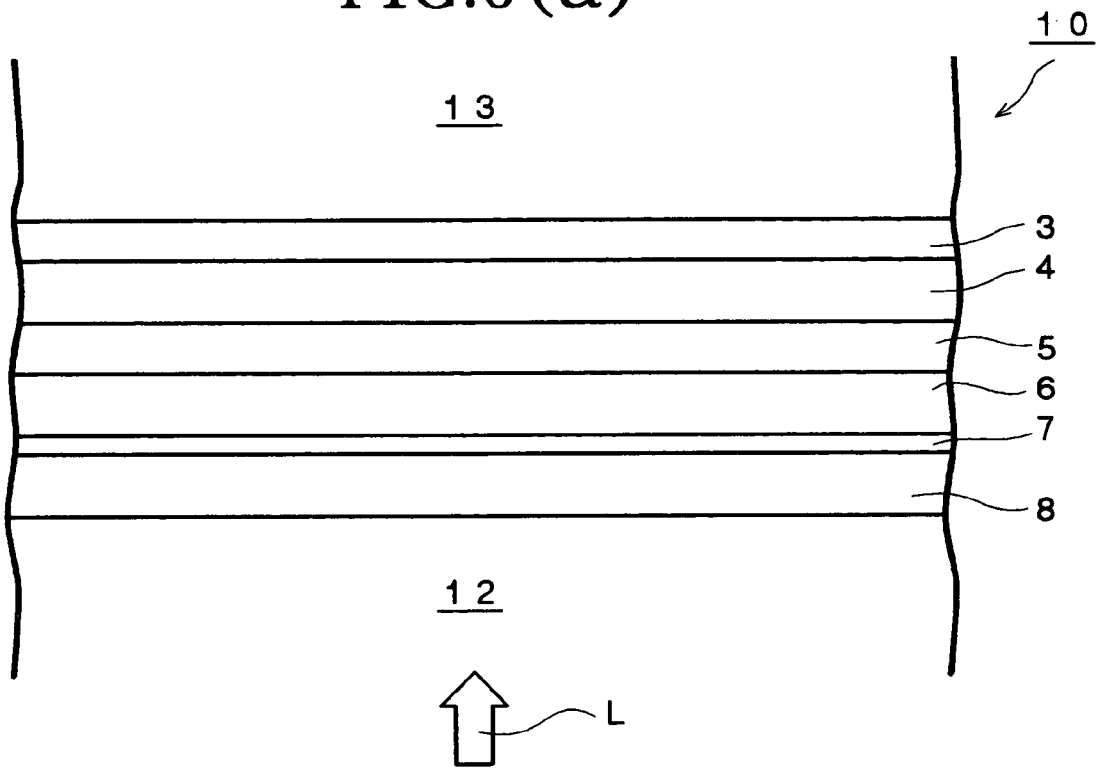
FIG. 6(a) is a partly enlarged schematic cross-sectional view of the optical recording disc shown in FIG. 4 and FIG. 5 before data are recorded therein and FIG. 6(b) is a partly enlarged schematic cross-sectional view of the optical recording disc shown in FIG. 4 and FIG. 5 after data were recorded therein.
Figure 6B:
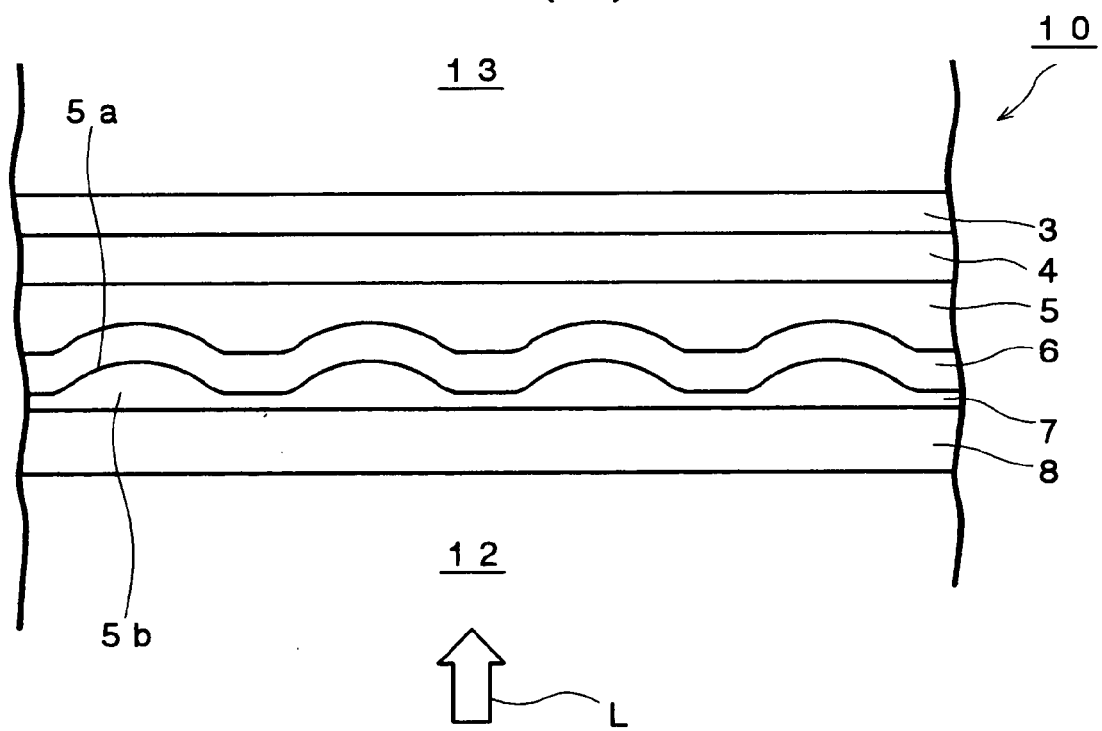

FIG. 6(*a*) is a partly enlarged schematic cross-sectional view of the optical recording disc 10 before data are recorded therein and FIG. 6(*b*) is a partly enlarged schematic cross-sectional view of the optical recording disc 10 after data were recorded therein.

When data are to be recorded in the optical recording disk 10, the laser beam L is irradiated onto the optical recording disc 10 from the side of the light transmission layer 12.

In this embodiment, in order to record data in the optical recording disk 10 with high recording density, a laser beam L having a wavelength $\lambda$ of 630 nm to 675 nm is irradiated onto the optical recording disk 10 using via an objective lens having a numerical aperture NA of 0.59 to 0.66.

The power of the laser beam L is set higher as the linear recording velocity is higher. For example, when the linear recording velocity is set to 6 m/s, the power of the laser beam L is set to be higher than 4 mW and equal to or lower than 12 mW. It is necessary to set the power of the laser beam L to be higher as the linear recording velocity is set to be higher. Here, the power of the laser beam L is defined as the power of the laser beam L on the surface of the optical recording disk 1.

When a laser beam L whose power is set to a predetermined power is irradiated onto the optical recording disk 1, regions of the metal recording layer 7 and the light absorption layer 5 exposed to the laser beam L are heated. Thus the temperature of the metal recording layer 7 is increased by heat generated by the laser beam L and absorbed in the metal recording layer 7 itself and also by heat generated in the light absorption layer 5 by the laser beam L and transferred to the metal recording layer 7. The metal recording layer 7 is therefore deformed to produce a state-changed region 7*a* in the metal recording layer 7 as shown in FIG. 6(*b*).

At the same time, as shown in FIG. 6 (*b*), the second dielectric layer 6 and the light absorption layer 5 are deformed together with the deformation of the metal recording layer 7, whereby state-changed regions are formed in the second dielectric layer 6 and the light absorption layer 5 correspondingly to the state-changed region 7*a* formed in the metal recording layer 7.

Since the state-changed regions formed by the deformation of the metal recording layer 7, the second dielectric layer 6 and the light absorption layer 5 in this manner have different optical characteristics from those of other regions of the metal recording layer 7, the second dielectric layer 6 and the light absorption layer 5 which are not deformed. A recording mark is formed by the state-changed regions formed by the deformation of the metal recording layer 7, the second dielectric layer 6 and the light absorption layer 5.

The laser beam is moved relative to the optical recording disk 1 along a track formed on the optical recording disk 10 and recording marks are formed along the track of the optical recording disk 1 in the similar manner to the above.

In this embodiment, thus formed recording marks and blank regions between neighboring recording marks include ones having a length shorter than $4NA/\lambda$ thereby a recording mark train including recording marks and blank regions having lengths shorter than the resolution limit is formed.

Thus, a recording mark train is formed in the optical recording disc 10, thereby recording data therein.

Data recorded in the optical recording disc 10 are reproduced in the following manner.

When data recorded in the optical recording disc 10 are to be reproduced, the laser beam L having a wavelength of 630 nm to 675 nm is first converged onto the optical recording disk 10 by an objective lens having a numerical aperture NA of 0.59 to 0.66.

In this embodiment, the power of the laser beam L irradiated onto the optical recording disk 1 for reproducing data is set to 0.5 mW to 4 mW so as to be higher than that normally used for reproducing data.

In a study done by the inventors of the present invention, it was found that even in the case where the length of the recording mark or the length of the blank region between neighboring recording marks constituting the recording mark train was shorter than the resolution limit, data recorded in the optical recording disc 10 could be reproduced by converging the laser beam L having a wavelength of 630 nm to 675 nm onto the optical recording disc 10 using an objective lens having a numerical aperture NA of 0.59 to 0.66 from the side of the light transmission layer 9.

Although it is not altogether clear why, in the case where the state-changed region 7a is formed in the metal recording layer 7 by deforming the metal recording layer 7 and the state-changed regions are formed by deforming the second dielectric layer 6 and the light absorption layer 5 as well as the metal recording layer 7, whereby a recording mark is formed in the metal recording layer 7, the second dielectric layer 6 and the light absorption layer 5 and data are recorded in the optical recording disc 1, the thus recorded data can be reproduced even when the length of a recording mark or the length of a blank region between neighboring recording marks constituting a recording mark train was shorter than the resolution limit, it is reasonable to assume that this is because the resolution limit becomes smaller for some reasons by irradiating the laser beam L for reproducing data onto the state-changed regions formed in the metal recording layer, the second dielectric layer 6 and the light absorption layer 5.

In this embodiment, since the metal recording layer 7 is formed of a metal simple substance having relatively low thermal conductivity or an alloy thereof, the recording sensitivity is excellent. Further, even in the case of repeatedly reproducing data recorded in the optical recording disc 1, since the shape of each of the state-changed regions and the shape of each of the recording marks do not change and a new state-changed region is not formed at regions other than regions where the recording marks are formed. Accordingly, it is possible to improve the reproduction durability of an optical recording disc 1.

According to this embodiment, since data can be reproduced even in the case where the length of a recording mark or the length of a blank region between neighboring recording marks constituting a recording mark train was shorter than the resolution limit, it is possible to record data in the optical recording disc 10 with higher density and it is therefore possible to markedly increase the storage capacity of an optical recording disc 10.

WORKING EXAMPLES

Hereinafter, a working example will be set out in order to further clarify the advantages of the present invention.

Working Example

An optical recording disc sample #1 was fabricated in the following manner.

A polycarbonate substrate having a thickness of 1.1 mm and a diameter of 120 mm was first set in a sputtering apparatus and a reflective layer containing 98 atomic % of Ag as a primary component and 1 atomic % of Pd and (1 atomic % of Cu as other components and having a thickness of 20 nm was formed on the surface of the polycarbonate substrate by a sputtering process.

A third dielectric layer having a thickness of 100 nm was then formed on the surface of the reflective layer by a sputtering process using a target of a mixture of ZnS and $SiO_2$.

Here, the mole ratio of ZnS to $SiO_2$ in the mixture of ZnS and $SiO_2$ was 80:20.

Further, a light absorption layer having a thickness of 20 nm was formed on the surface of the third dielectric layer by a sputtering process using a target of $Ag_{5.9}In_{4.4}Sb_{61.1}Te_{28.6}$.

Then, a second dielectric layer having a thickness of 60 nm was then formed on the surface of the light absorption layer by a sputtering process using a target of a mixture of ZnS and $SiO_2$.

Here, the mole ratio of ZnS to $SiO_2$ in the mixture of ZnS and $SiO_2$ was 80:20.

Further, a metal recording layer having a thickness of 4 nm was formed on the surface of the second dielectric layer by a sputtering process using a target of Ti having thermal conductivity of 0.21 W/(cm·K).

A first dielectric layer having a thickness of 70 nm was then formed on the surface of the metal recording layer by a sputtering process using a target of a mixture of ZnS and $SiO_2$.

Here, the mole ratio of ZnS to $SiO_2$ in the mixture of ZnS and $SiO_2$ was 80:20.

Finally, a solution of an acrylic ultraviolet ray curable resin was applied onto the surface of the first dielectric layer using a spin coating method to form a coating layer and an ultraviolet ray was irradiated onto the coating layer to cure the acrylic ultraviolet ray curable resin, thereby forming a light transmission layer having a thickness of 100 μm.

Thus, the optical recording disc sample #1 was fabricated.

Then, an optical recording disk sample #2 was fabricated in the manner of fabricating the optical recording disc sample #1 except that a metal recording layer was formed by a sputtering process using a target of Sn having thermal conductivity of 0.611 W/(cm·K).

Further, an optical recording disk sample #3 was fabricated in the manner of fabricating the optical recording disc sample #1 except that a metal recording layer was formed by a sputtering process using a target of Pt having thermal conductivity of 0.690 W/(cm·K).

Then, an optical recording disk sample #4 was fabricated in the manner of fabricating the optical recording disc sample #1 except that a metal recording layer was formed by a sputtering process using a target of Zn having thermal conductivity of 1.11 W/(cm·K).

Furthermore, an optical recording disk sample #5 was fabricated in the manner of fabricating the optical recording disc sample #1 except that a metal recording layer was formed by a sputtering process using a target of Mg having thermal conductivity of 1.51 W/(cm·K).

Then, an optical recording disk sample #6 was fabricated as a comparative sample in the manner of fabricating the optical recording disc sample #1 except that a metal recording layer was formed by a sputtering process using a target of Al having thermal conductivity of 2.26 W/(cm·K).

Furthermore, an optical recording disk sample #7 was fabricated a comparative sample in the manner of fabricating the optical recording disc sample #1 except that a metal recording layer was formed by a sputtering process using a target of Ag having thermal conductivity of 4.27 W/(cm·K).

Then, an optical recording disk sample #8 was fabricated as a comparative sample in the manner of fabricating the optical recording disc sample #1 except that a metal recording layer was formed by a sputtering process using a target of Cu having thermal conductivity of 3.98 W/(cm·K).

Further, each of the optical recording disc samples #1 to #8 was set in an optical recording medium evaluation apparatus. Then, a blue laser beam having a wavelength of 405 nm was used as a laser beam for recording data and the laser beam was irradiated onto each of the optical recording disc samples #1 to #8 from the side of the light transmission layer using an objective lens having an NA (numerical aperture) of 0.85. Thus, a train including repeated recording marks and blank regions was formed in each of the optical recording disc samples #1 to #8 at a linear recording velocity of 4.9 m/sec so that the lengths of the recording marks and blank regions were respectively 50 nm, 75 nm, 80 nm, 113 nm, 150 nm, 188 nm, 225 nm, 263 nm, and 300 nm, thereby recording data in each of the optical recording disc samples #1 to #8.

Here, a recording power Pw of the laser beam irradiated onto each of the optical recording disc samples #1 to #8 was set to values indicated in Table. 1.

After recording data, data recorded in each of the optical recording disk samples #1 to #8 were reproduced using the above mentioned optical recording medium evaluation apparatus and the C/N ratios of reproduced signals were measured.

Here, the reproducing power Pr of the laser beam irradiated onto the optical recording disc samples #1 to #8 was set to the values in Table 1.

The results of the measurement are shown in Table 1.

system in which a recording mark having a length of 75 nm is assumed to be the shortest recording mark.

On the other hand, as shown in Table 1, it was found that in the optical recording disc sample #1, even in the case where data recorded in the optical recording disc sample #1 by forming the recording mark and the blank region so that each had a length of 113 nm (longer than the resolution limit) were reproduced, where data recorded in the optical recording disc sample #1 by forming the recording mark and the blank region so that each had a length of 150 nm (longer than the resolution limit) were reproduced, where data recorded in the optical recording disc sample #1 by forming the recording mark and the blank region so that each had a length of 188 nm (longer than the resolution limit) were reproduced, where data recorded in the optical recording disc sample #1 by forming the recording mark and the blank region so that each had a length of 225 nm (longer than the resolution limit) were reproduced, where data recorded in

TABLE 1

| | Samples (material) | | | | | | | |
|---|---|---|---|---|---|---|---|---|
| | #1(Ti) | #2(Sn) | #3(Pt) | #4(Zn) | #5(Mg) | #6(Al) | #7(Ag) | #8(Cu) |
| Thickness of the metal recording layer (nm) | 4 | 4 | 4 | 4 | 4 | 4 | 4 | 4 |
| Thermal conductivity (W/(cm · K)) | 0.2 | 0.6 | 0.7 | 1.1 | 1.5 | 2.3 | 4.3 | 4.0 |
| Recording power Pw (mW) | 10 | 9 | 11 | 10 | 9 | 12 | 12.5 | 12.5 |
| Reproducing power Pr (mW) | 2 | 2 | 3.2 | 3 | 1.8 | 2.2 | 2 | 2.2 |
| Lengths of the recording mark (nm) | CNR (dB) | CNR (dB) | CNR (dB) | CNR (dB) | CNR (dB) | CNR (dB) | CNR (dB) | CNR (dB) |
| 50 | 32.6 | 29.6 | 25.2 | 31.7 | 32.1 | | 19 | 18.8 |
| 75 | 40.9 | 37.3 | 40 | 40 | 39.2 | 33.1 | 34 | 32.7 |
| 80 | 35 | 39.9 | 39.7 | | | | | |
| 113 | 52.7 | 49.7 | 39.4 | 44.1 | 42.7 | | 49.1 | 34.5 |
| 150 | 57.2 | | 40.3 | | 55.7 | | | |
| 188 | 58 | 55.4 | 35.3 | 43.3 | 52.8 | | 54.1 | 46.6 |
| 225 | 53.8 | | 47 | | 52.4 | | | |
| 263 | 52 | 51.3 | 49.7 | | 48.1 | | 52.1 | |
| 300 | | | 50.3 | 54.3 | 49.1 | 48 | | 50.7 |

As shown in Table 1, it was found that in the optical recording disc sample #1 whose metal recording layer was formed using a target of Ti, even in the case where data recorded in the optical recording disc sample #1 by forming the recording mark and the blank region so that each had a length of 50 nm (shorter than the resolution limit) were reproduced, where data recorded in the optical recording disc sample #1 by forming the recording mark and the blank region so that each had a length of 75 nm (shorter than the resolution limit) were reproduced, or where data recorded in the optical recording disc sample #1 by forming the recording mark and the blank region so that each had a length of 80 nm (shorter than the resolution limit) were reproduced, the C/N ratio of the reproduced signal was 32.6 dB, 40.9 dB or 35.0 dB and a reproduced signal having an extremely high C/N ratio could be obtained.

Here, in the case where the C/N ratio of the reproduced signal was equal to or larger than 35 dB, jitter of the reproduced signal could be measured using a time interval analyzer through a commercially available limit equalizer circuit and data recorded in the optical recording disc could be reproduced using a conventional optical recording disc system. In the optical recording disc sample #1, since the C/N ratio of the reproduced signal obtained by reproducing data recorded therein by forming the recording mark and the blank region so that each had a length of 75 nm exceeded 40 dB, it is possible to constitute an optical recording disc the optical recording disc sample #1 by forming the recording mark and the blank region so that each had a length of 263 nm (longer than the resolution limit) were reproduced, or where data recorded in the optical recording disc sample #1 by forming the recording mark and the blank region so that each had a length of 300 nm (longer than the resolution limit) were reproduced, the C/N ratio of the reproduced signal was 52.7 dB, 57.2 dB, 58.0 dB, 53.8 dB or 52.0 dB and a reproduced signal having a high C/N ratio could be obtained. More specifically, it was found that assuming that the recording mark having a length of 75 nm was the shortest recording mark and the recording mark having a length of 300 nm was the longest recording mark, similarly to an optical recording disc system currently in practical use, it was possible to constitute a system which could code data in accordance with the lengths of recording marks, record the data and reproduce the data, and it was possible to achieve a linear recording density higher than double the conventional density.

Further, as shown in Table 1, in each of the optical recording disc sample #2 whose metal recording layer was formed using the target of Sn, the optical recording disc sample #3 whose metal recording layer was formed using the target of Pt, the optical recording disc sample #4 whose metal recording layer was formed using the target of Zn and the optical recording disc sample #5 whose metal recording layer was formed using the target of Mg, it was found that in the case where data recorded by forming the recording mark and the blank region so that each had a length of 75 nm or 80 nm (shorter than the resolution limit) were reproduced, the C/N ratio of the reproduced signal was equal to or higher than 35 dB and a reproduced signal having a considerably high C/N ratio could be obtained.

As explained above, since the minimum value of the C/N ratio of a reproduced signal at which jitter of the reproduced signal can measured through the limit equalizer is 35 dB, assuming that this C/N ratio is a critical line for determining whether or not a recording mark can be reproduced, in the optical recording disc samples #2 to #5, the minimum value of the C/N ratio of the reproduced signal in the case of forming the recording mark and the blank region so that each had a length of 75 nm was 37.3 dB and the minimum value of the C/N ratio of the reproduced signal in the case of forming the recording mark and the blank region so that each had a length of 80 nm was 39.7 dB. Therefore, it was found that in the optical recording disc samples #2 to #5, even in the case where the lengths of a recording mark and a blank region were shorter than the resolution limit, data could be reproduced so long as the length of the recording mark and the blank region were longer than 75 nm.

Further, as shown in Table 1, it was found that in each of the optical recording disc samples #2 to #5, even in the case where data recorded by forming the recording mark and the blank region so that each had a length of 113 nm (longer than the resolution limit) were reproduced, where data recorded by forming the recording mark and the blank region so that each had a length of 150 nm (longer than the resolution limit) were reproduced, where data recorded by forming the recording mark and the blank region so that each had a length of 188 nm (longer than the resolution limit) were reproduced, where data recorded by forming the recording mark and the blank region so that each had a length of 225 nm (longer than the resolution limit) were reproduced, where data recorded by forming the recording mark and the blank region so that each had a length of 263 nm (longer than the resolution limit) were reproduced, or where data recorded by forming the recording mark and the blank region so that each had a length of 300 nm (longer than the resolution limit) were reproduced, the C/N ratio of the reproduced signal was equal to or higher than 40 dB and thus a reproduced signal having a high C/N ratio could be obtained even in the case of forming the recording mark and the blank region so that each had a length longer than the resolution limit.

It is not altogether clear why reproducible data could be recorded using the laser beam having a lower recording power in each of the optical recording disc samples #4 and #5 despite the fact that the thermal conductivities of the metal recording layers were somewhat low. However, it is thought that this was because the metal recording layer was deformed and reacted with the dielectric layer to be changed in quality.

To the contrary, as shown in Table 1, it was found that in each of the optical recording disc samples #6 to #8, which were comparative samples, the maximum C/N ratio of the reproduced signal was 34 dB in the case of forming the recording mark and the blank region so that each had a length of 75 nm in the metal recording layer thereof, recording data therein and reproducing the data, and since jitter of the C/N ratio could not be measured even by use of a limit equalizer, it was extremely difficult to constitute a system premised on the current optical recording disc system in which a recording mark of a length equal to or shorter than the resolution limit was set as the shortest recording mark. It is reasonable to assume that this was because the thermal conductivity of the metal recording layer in each of the optical recording disc samples #6 to #8 was higher than that in each of the optical recording disc samples #1 to #7 and in the case of setting the recording power of the laser beam to values identified in Table 1 and forming the recording marks at the linear recording velocity of 4.9 m/sec, it was impossible to sufficiently increase the temperature of the metal recording layer and form the recording marks in the desired manner. Although it is possible to sufficiently increase the temperature of the metal recording layer in each of the optical recording disc samples #6 to #8 by decreasing the linear recording velocity, since the maximum power of a laser beam source currently available 12 mW, it is impossible to form a recording mark and record data in each of the optical recording disc samples #6 to #8 at a practical data transfer rate in a desired manner.

The present invention has thus been shown and described with reference to a specific embodiment and a working example. However, it should be noted that the present invention is in no way limited to the details of the described arrangements but changes and modifications may be made without departing from the scope of the appended claims.

For example, in the above described preferred embodiment shown in FIGS. 4 to 6, although the optical recording disc 10 is constituted by laminating the first dielectric layer 8, the metal recording layer 7, the second dielectric layer 6, the light absorption layer 5, the third dielectric layer 4 and the substrate 13 for adjusting the thickness of the optical recording disc 10 on the light transmissible substrate 12 in this order, it is not absolutely necessary to constitute the optical recording disc 10 by laminating the first dielectric layer 8, the metal recording layer 7, the second dielectric layer 6, the light absorption layer 5, the third dielectric layer 4 and the substrate 13 for adjusting the thickness of the optical recording disc 10 on the light transmissible substrate 12 in this order and a reflective layer may be formed between the third dielectric layer 4 and the substrate 13 for adjusting the thickness in order to further improve reflectivity to the laser beam L. Moreover, if it is unnecessary to adjust the total thickness of the optical recording disc 10, the substrate 13 for adjusting the thickness may be omitted and a light transmittable substrate 13 having a thickness capable of ensuring the rigidity required for the optical recording disc 10 may be employed instead of the substrate 13 for adjusting the thickness.

Further, in the above described preferred embodiment shown in FIGS. 4 to 6, although data are recorded in the optical recording disc 10 and data recorded in the optical recording disc 10 are reproduced using the laser beam L having a wavelength λ of 630 nm to 675 nm and the objective lens having a numerical aperture NA of 0.59 to 0.6, it is possible to record data in the optical recording disc 10 and reproduce data recorded in the optical recording disc 10 using a laser beam having a wavelength λ of 405 nm and an objective lens having a numerical aperture NA of 0.65.

Furthermore, although the optical recording disc 1, 10 according to each of the above described preferred embodiments is constituted by laminating the metal recording layer 7, the second dielectric layer 6 and the light absorption layer 5 from the light incidence plane of the laser beam L in this order, it is not absolutely necessary to laminate the metal recording layer 7, the second dielectric layer 6 and the light absorption layer 5 from the light incidence plane of the laser beam L in this order and it is sufficient for the optical recording disc to include a multi-layered body formed by at least a metal recording layer and a light absorption layer so as to sandwich a dielectric layer. The optical recording disc may be constituted by laminating the metal recording layer 7, the second dielectric layer 6 and the light absorption layer 5 from the opposite side of the light incidence plane of the laser beam L in this order or laminating a light absorption layer, a dielectric layer, a metal recording layer, a dielectric layer and a light absorption layer from the light incidence plane of the laser beam L or from the opposite side of the light incidence plane of the laser beam L in this order, for example.

Moreover, in the above described preferred embodiments, although the optical recording disc 1, 10 is constituted so that when the laser beam is irradiated onto the optical recording disc 1, 10, the metal recording layer 7 is deformed to form a state-changed region 7a in the metal recording layer 7 and at the same time, the second dielectric layer 6 and the light absorption layer 5 are deformed to form state-changed regions in the second dielectric layer 6 and the light absorption layer 5, whereby a recording mark is formed in the metal recording layer 7, the second dielectric layer 6 and the light absorption layer 5 and data are recorded therein, it is not absolutely necessary to constitute the optical recording disc 1, 10 so that the state-changed regions are formed in the second dielectric layer 6 and the light absorption layer 5 as well as the metal recording layer 7 and the optical recording disc 1, 10 may be constituted so that only the second dielectric layer 6 is deformed in addition to the deformation of the metal recording layer 7 and state-changed regions are formed in the metal recording layer 7 and the second dielectric layer 6, whereby a recording mark is formed therein. Further, it is possible to constitute the optical recording disc 1, 10 so that only the metal recording layer 7 is deformed and a state-changed region is formed only in the metal recording layer 7, whereby a recording mark is formed therein.

Furthermore, in the above described preferred embodiments, although the optical recording disc 1, 10 is constituted so that when the laser beam is irradiated onto the optical recording disc 1, 10, the metal recording layer 7 is deformed to form a state-changed region 7a in the metal recording layer 7 and at the same time, the second dielectric layer 6 and the light absorption layer 5 are deformed to form state-changed regions in the second dielectric layer 6 and the light absorption layer 5, whereby a recording mark is formed in the metal recording layer 7, the second dielectric layer 6 and the light absorption layer 5 and data are recorded therein, it is possible instead to constitute the optical recording disc 1, 10 so that when the laser beam is irradiated onto the optical recording disc 1, 10, the metal recording layer 7 is changed in quality and the refractive index and the extinction coefficient thereof change, whereby a state-changed region 7a is formed in the metal recording layer 7 and a recording mark is formed therein. Further, it is possible to constitute the optical recording disc 1, 10 so that not only the metal recording layer 7 is changed in quality but also the second dielectric layer 6 and the light absorption layer 5 are changed in quality, whereby state-changed regions are formed in the metal recording layer 7, the second dielectric layer 6 and the light absorption layer 5 and a recording mark is formed therein. Moreover, it is possible to constitute the optical recording disc 1, 10 so that when the metal recording layer 7 is deformed, the second dielectric layer 6 and the light absorption layer 5 are changed in quality, whereby a recording mark is formed in the second dielectric layer 6 or in both the second dielectric layer 6 and the light absorption layer 5

According to the present invention, it is possible to provide an optical recording disk which can record data therein and reproduce data therefrom even in the case where the lengths of a recording mark and a blank region between neighboring recording marks which constitute the data are shorter than the resolution limit and whose storage capacity can be markedly increased.

The invention claimed is:

1. An optical recording disc constituted so that data are recorded therein or reproduced therefrom by irradiating a laser beam thereonto, which comprises a multi-layered body including a metal recording layer containing a metal whose thermal conductivity is equal to or smaller than 2.0 W/(cm·K) as a primary component and a light absorption layer, which are formed so as to sandwich at least a dielectric layer therebetween.

2. An optical recording disc in accordance with claim 1, which is constituted so that when the laser beam is irradiated thereonto, at least the metal recording layer is deformed and/or is changed in quality to form a state-changed region in the metal recording layer, whereby a recording mark is formed in the metal recording layer.

3. An optical recording disc in accordance with claim 1, wherein the metal recording layer is formed so as to have a thickness of 1 nm to 20 nm.

4. An optical recording disc in accordance with claim 2, wherein the metal recording layer is formed so as to have a thickness of 1 nm to 20 nm.

5. An optical recording disc in accordance with claim 1, wherein the metal recording layer is formed so as to contain at least one kind of metal selected from a group consisting of Ti, Sn, Pt, Zn and Mg or an alloy thereof.

6. An optical recording disc in accordance with claim 2, wherein the metal recording layer is formed so as to contain at least one kind of metal selected from a group consisting of Ti, Sn, Pt, Zn and Mg or an alloy thereof.

7. An optical recording disc in accordance with claim 3, wherein the metal recording layer is formed so as to contain at least one kind of metal selected from a group consisting of Ti, Sn, Pt, Zn and Mg or an alloy thereof.

8. An optical recording disc in accordance with claim 4, wherein the metal recording layer is formed so as to contain at least one kind of metal selected from a group consisting of Ti, Sn, Pt, Zn and Mg or an alloy thereof.

9. An optical recording disc in accordance with claim 2, which is constituted so that when the laser beam is irradiated thereonto, the dielectric layer disposed adjacent to the metal recording layer is further deformed and/or changed in quality in addition to the metal recording layer and state-changed regions are formed in the dielectric layer as well as the metal recording layer, whereby a recording mark is formed in the metal recording layer and the dielectric layer.

10. An optical recording disc in accordance with claim 4, which is constituted so that when the laser beam is irradiated thereonto, the dielectric layer disposed adjacent to the metal recording layer is further deformed and/or changed in quality in addition to the metal recording layer and state-changed regions are formed in the dielectric layer as well as the metal recording layer, whereby a recording mark is formed in the metal recording layer and the dielectric layer.

11. An optical recording disc in accordance with claim 6, which is constituted so that when the laser beam is irradiated thereonto, the dielectric layer disposed adjacent to the metal recording layer is further deformed and/or changed in quality in addition to the metal recording layer and state-changed regions are formed in the dielectric layer as well as the metal recording layer, whereby a recording mark is formed in the metal recording layer and the dielectric layer.

12. An optical recording disc in accordance with claim 8, which is constituted so that when the laser beam is irradiated thereonto, the dielectric layer disposed adjacent to the metal recording layer is further deformed and/or changed in quality in addition to the metal recording layer and state-changed regions are formed in the dielectric layer as well as the metal recording layer, whereby a recording mark is formed in the metal recording layer and the dielectric layer.

13. An optical recording disc in accordance with claim 2, which is constituted so that when the laser beam is irradiated thereonto, the dielectric layer disposed adjacent to the metal recording layer and the light absorption layer disposed adjacent to the dielectric layer are deformed and/or are changed in quality in addition to the metal recording layer and state-changed regions are formed in the light absorption layer as well as the metal recording layer and the dielectric layer, whereby a recording mark is formed in the metal recording layer, the dielectric layer and the light absorption layer.

14. An optical recording disc in accordance with claim 4, which is constituted so that when the laser beam is irradiated thereonto, the dielectric layer disposed adjacent to the metal recording layer and the light absorption layer disposed adjacent to the dielectric layer are deformed and/or are changed in quality in addition to the metal recording layer and state-changed regions are formed in the light absorption layer as well as the metal recording layer and the dielectric layer, whereby a recording mark is formed in the metal recording layer, the dielectric layer and the light absorption layer.

15. An optical recording disc in accordance with claim 6, which is constituted so that when the laser beam is irradiated thereonto, the dielectric layer disposed adjacent to the metal recording layer and the light absorption layer disposed adjacent to the dielectric layer are deformed and/or are changed in quality in addition to the metal recording layer and state-changed regions are formed in the light absorption layer as well as the metal recording layer and the dielectric layer, whereby a recording mark is formed in the metal recording layer, the dielectric layer and the light absorption layer.

16. An optical recording disc in accordance with claim 8, which is constituted so that when the laser beam is irradiated thereonto, the dielectric layer disposed adjacent to the metal recording layer and the light absorption layer disposed adjacent to the dielectric layer are deformed and/or are changed in quality in addition to the metal recording layer and state-changed regions are formed in the light absorption layer as well as the metal recording layer and the dielectric layer, whereby a recording mark is formed in the metal recording layer, the dielectric layer and the light absorption layer.

17. An optical recording disc in accordance with claim 1, wherein the light absorption layer contains at least one kind of metal selected from the group consisting of Sb and Te.

18. An optical recording disc in accordance with claim 2, wherein the light absorption layer contains at least one kind of metal selected from the group consisting of Sb and Te.

19. An optical recording disc in accordance with claim 1, wherein the dielectric layer is formed of a mixture of $SiO_2$ and ZnS.

20. An optical recording disc in accordance with claim 2, wherein the dielectric layer is formed of a mixture of $SiO_2$ and ZnS.

* * * * *